United States Patent
Yin et al.

(10) Patent No.: US 11,852,920 B2
(45) Date of Patent: Dec. 26, 2023

(54) LIGHT GUIDE PLATE, BACKLIGHT MODULE, AND LIQUID CRYSTAL DISPLAY MODULE

(71) Applicant: Wuhan China Star Optoelectronics Technology Co., Ltd., Hubei (CN)

(72) Inventors: Bingkun Yin, Hubei (CN); Changchih Huang, Hubei (CN); Guanghui Liu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 515 days.

(21) Appl. No.: 17/051,257

(22) PCT Filed: Aug. 28, 2020

(86) PCT No.: PCT/CN2020/112041
§ 371 (c)(1),
(2) Date: Oct. 28, 2020

(87) PCT Pub. No.: WO2022/000746
PCT Pub. Date: Jan. 6, 2022

(65) Prior Publication Data
US 2023/0137477 A1  May 4, 2023

(30) Foreign Application Priority Data
Jun. 29, 2020 (CN) .......................... 202010602432.5

(51) Int. Cl.
*G02F 1/1335* (2006.01)
*F21V 8/00* (2006.01)
*G02F 1/13357* (2006.01)

(52) U.S. Cl.
CPC ..... *G02F 1/133607* (2021.01); *G02B 6/0036* (2013.01); *G02F 1/133615* (2013.01)

(58) Field of Classification Search
CPC .......................... G02B 6/0036; G02B 6/0053
See application file for complete search history.

(56) References Cited

U.S. PATENT DOCUMENTS

2008/0252816 A1* 10/2008 Hwang ................ G02B 6/0038
349/64
2010/0085735 A1    4/2010 Kim et al.
(Continued)

FOREIGN PATENT DOCUMENTS

CN            2586972 Y       11/2003
CN            101819289        9/2010
(Continued)

*Primary Examiner* — Keith G. Delahoussaye

(57) ABSTRACT

A light guide plate including a substrate; a first refractive index layer; a second refractive index layer stacked on the first refractive index layer, and a reflective layer disposed on a surface of the substrate opposite to the first refractive index layer, wherein the first refractive index layer is a structure of a plurality of prisms distributed on an emergence surface of the substrate, forming prism-structured netted dots. Through disposing the prism-structured netted dots, the reflective layer, and the second refractive index layer on the light guide plate substrate, and using refraction and reflection of each layer to realize adjustment of emergence angle, a function of an independent diffuser, prism, and reflector is realized. The light guide plate is used as CF or TFT substrate to manufacture a liquid crystal display, and a backlight module is integrated into a liquid crystal panel, decreasing a thickness of a liquid crystal module.

14 Claims, 4 Drawing Sheets

(56) References Cited

U.S. PATENT DOCUMENTS

| | | | |
|---|---|---|---|
| 2011/0051046 A1* | 3/2011 | Kim | G02B 6/0053 |
| | | | 362/326 |
| 2012/0169965 A1* | 7/2012 | Tang | G02B 5/045 |
| | | | 359/625 |
| 2014/0056027 A1 | 2/2014 | Ma | |
| 2014/0340930 A1* | 11/2014 | Nakagome | G02B 6/0043 |
| | | | 362/606 |
| 2016/0187699 A1* | 6/2016 | Ju | G02F 1/133504 |
| | | | 349/96 |
| 2016/0202408 A1* | 7/2016 | Wang | G02B 6/0056 |
| | | | 156/60 |
| 2020/0132914 A1* | 4/2020 | Song | G02B 6/0051 |

FOREIGN PATENT DOCUMENTS

| | | |
|---|---|---|
| CN | 102176080 | 9/2011 |
| CN | 202421530 | 9/2012 |
| CN | 102809105 | 12/2012 |
| CN | 203849450 | 9/2014 |
| CN | 104280797 | 1/2015 |
| CN | 105182613 | 12/2015 |
| CN | 111103728 | 5/2020 |
| JP | 09-184922 | 7/1997 |

\* cited by examiner

LIGHT GUIDE PLATE, BACKLIGHT MODULE, AND LIQUID CRYSTAL DISPLAY MODULE

RELATED APPLICATIONS

This application is a National Phase of PCT Patent Application No. PCT/CN2020/112041 having International filing date of Aug. 28, 2020, which claims the benefit of priority of Chinese Patent Application No. 202010602432.5 filed on Jun. 29, 2020. The contents of the above applications are all incorporated by reference as if fully set forth herein in their entirety.

FIELD AND BACKGROUND OF THE INVENTION

The present invention relates to the field of liquid crystal display technology, and especially to a light guide plate, a backlight module, and a liquid crystal display module.

With development of digital technology, liquid crystal display products have been widely applied to various aspects in daily life, and requirements for thinner and more lightweight liquid crystal display modules are also gradually increased. A structure of a liquid crystal display module adopts a liquid crystal display panel in combination with a backlight module. A conventional edge light backlight module usually consists of independent optical films such as a reflector, a light guide plate, a diffuser, a prism, etc. FIG. 1 shows a structure of a liquid crystal display module that includes the conventional edge light backlight module. The backlight module 10 includes a plurality of independent optical films such as a light source 101, a light guide plate substrate 102, a reflecting layer 103, scattering netted dots 104, a diffuser 105, a lower prism 106, an upper prism 107, etc.

SUMMARY OF THE INVENTION

The conventional edge light backlight module in FIG. 1 has a complicated structure and assembly process, impeding realization of lightweight and thinness of a liquid crystal display module. In order to resolve a problem of being cumbersome to achieve the liquid crystal display module's lightweight and thinness and the complicated assembly process, it is necessary to develop a liquid crystal display module where a backlight is integrated into a liquid crystal display panel to effectively realize lightweight and thinness of the liquid crystal display module and simplify the assembly process.

In order to solve drawbacks of conventional technology, a main purpose of the present invention is to provide a light guide plate, a backlight module, and a liquid crystal display module that can realize integration of the backlight module and a liquid crystal panel to decrease a thickness of the liquid crystal display module.

In order to realize the purpose above, the present invention provides a light guide plate that includes:

A substrate;
A first refractive index layer including a plurality of prism structures, wherein the plurality of prism structures are distributed on an emergence surface to form prism-structured netted dots;
A second refractive index layer stacked on the first refractive index layer; and
A reflective layer disposed on a surface of the substrate opposite to the first refractive index layer.

In some embodiments, the first refractive index layer has a first refractive index $n_1$, and the first refractive index $n_1$ is greater than a refractive index of the substrate $n_0$.

In some embodiments, the second refractive index layer has a second refractive index $n_2$, and the second refractive index $n_2$ is less than the refractive index of the substrate $n_0$.

In some embodiments, when an apex angle of the prism structures is cut in half with respect to a normal of a lower side of prisms, two sub-angles produced are equal. The prism structures are distributed on an emergence surface of the substrate as distributed netted dots, such that light emitting out from the emergence surface of the substrate is uniformly directed out through the prism-structured netted dots.

In some embodiments, the second refractive index layer fills gaps between the prism-structured netted dots of the first refractive index layer and forms a planar upper surface.

In some embodiments, the light guide plate further includes a third refractive index layer and a planarization layer, wherein the third refractive index layer and the planarization layer are sequentially stacked on an upper surface of the second refractive index layer.

In some embodiments, the third refractive index layer is a prism layer, and a refractive index of the third refractive index layer $n_3$ is greater than the second refractive index $n_2$.

In some embodiments, the refractive index of the third refractive index layer $n_3$ can be the same as or different from a refractive index of the first refractive index layer $n_1$.

In some embodiments, the substrate is a glass substrate.

In some embodiments, the reflective layer is a metal reflective layer.

In another aspect, the present invention provides a backlight module that includes the light guide plate and an incident light source as described above, wherein the incident light source is disposed on an incident light side of the light guide plate.

In some embodiments, the second refractive index layer has a total internal reflection critical angle $\delta$ defined, the total internal reflection critical angle is an incidence angle when an included angle between a refracted light and a normal direction (refracted angle) is ninety degrees, the normal direction is perpendicular to an emergence surface of the substrate, and $\delta = \arcsin(n_2/n_0)$. When an incident light reaches the second refractive index layer with gaps of the prism-structured netted dots directly through the substrate, if the incidence angle $\theta_0 < \delta$, then the light enters the second refractive index layer to form a first light path. If the incidence angle $\theta_0 \geq \delta$, a total internal reflection will occur. The light goes back into the substrate, and, after reflection of the reflective layer, reaches the first refractive index layer.

Each prism structure of the prism-structured netted dots of the first refractive index layer has an apex angle $\alpha$ defined. When an incident light enters the first refractive index layer through the substrate, because $n_1 < n_0$, a refraction occurs, and the refraction angle is $\theta_1 = \arcsin((n_0/n_1) \times \sin\theta_0)$. When $\theta_1 \leq (180-\alpha)/2$, an emergent light that passes through a prism structure can enter the second refractive index layer and then emit out to form a second light path. When $\theta_1 > (180-\alpha)/2$, the emergent light that passes through the prism structure will enter a next prism structure, and, after going through optical effects of the second prism structure and the reflective layer, emit again toward the second refractive index layer or the first refractive index layer from the substrate, with gradually decreasing incidence angles. Until an incidence angle incident at the second refractive index layer is less than $\delta$, or until a refraction angle $\theta_1$ when entering the first refractive index layer is less than or equal to $(180-\alpha)/2$, the emergent light enters the second refractive index layer 109 and then emits out to form a third light path.

In some embodiments, the backlight module is an edge light backlight module, and the backlight module includes at least one light source of an incident light.

In some embodiments, the light source of the incident light is a light-emitting diode (LED) light source.

In still another aspect, the present invention provides a liquid crystal display module that includes the backlight module as described above.

In some embodiments, a color filter (CF) layer or a thin film transistor (TFT) array is disposed on a surface of the light guide plate in the edge light back light module. For example, a CF layer or a TFT array is directly disposed on an upper surface of a planarization layer of the light guide plate.

The present invention further provides a manufacturing method of the light guide plate that includes:

Forming a first refractive index layer on a surface of a light guide plate substrate, and forming a reflective layer on a surface opposite to the first refractive index layer;

Forming a distribution of prism-structured netted dots on the first refractive index layer, and disposing a second refractive index layer on the first refractive index layer.

In some embodiments, the manufacturing method further includes disposing a third refractive index layer on an upper surface of the second refractive index layer, and disposing a planarization layer on the third refractive index layer.

In some embodiments, when manufacturing the first refractive index layer or the third refractive index layer, first, a planar surface is formed on an upper surface of the substrate or the upper surface of the second refractive index layer through coating, spray coating, vapor deposition, etc., and then a prism structure is formed from the surface. Methods to form the prism structure include but are not limited to at least one of imprint, etching, burning, cutting, etc.

The light guide plate, the backlight module, and the liquid crystal display module according to the present invention can be applied to the field of liquid crystal display, which includes but is not limited to display fields such as wearable device displays, portable electronic device displays, mobile communication, computers, televisions, commercial advertisement display, military equipment, etc.

Beneficial effects of the present invention: the present invention forms prism-structured netted dots on an upper surface of a substrate and plates a reflective layer on its lower surface. Through refraction of light by the prism-structured netted dots and reflection by the reflective layer, an emergence angle is adjusted to realize a function of a single light guide plate, diffuser, and reflector, and decrease a thickness of the backlight module. Meanwhile, the light guide plate can be directly used as a substrate for manufacturing a CF or TFTs to manufacture a liquid crystal display. Integrating the backlight module and a liquid crystal panel further decreases a thickness of the liquid crystal display module, which can widely be applied to manufacturing thin type liquid crystal displays.

BRIEF DESCRIPTION OF THE SEVERAL VIEWS OF THE DRAWINGS

With reference to the following drawings, the technical approach and other beneficial effects of the present invention will be obvious through describing embodiments of the present invention in detail.

DESCRIPTION OF SPECIFIC EMBODIMENTS OF THE INVENTION

Figure 1:
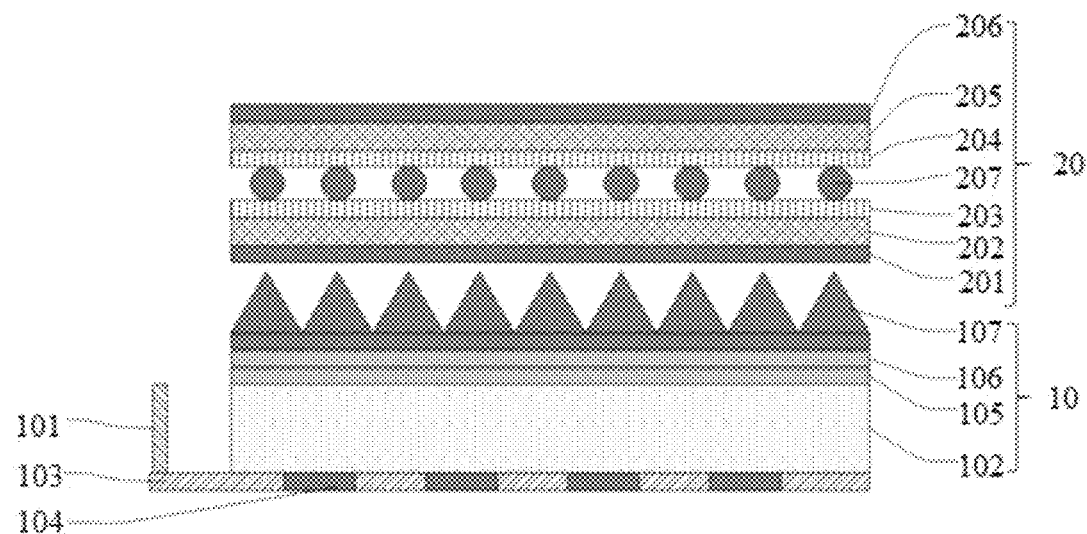
FIG. 1 is a sectional schematic diagram of a conventional liquid crystal display module.

The embodiments of the present invention are described in detail hereinafter. Examples of the described embodiments are given in the accompanying drawings. It should be noted that the following embodiments are intended to illustrate and interpret the present invention, and shall not be construed as causing limitations to the present invention. Similarly, the following embodiments are part of the embodiments of the present invention and are not the whole embodiments, and all other embodiments obtained by those skilled in the art without making any inventive efforts are within the scope protected by the present invention.

In description of embodiments of the present invention, it should be understood that terms that indicates orientation or relation of position such as "center", "longitudinal", "lateral", "length", "width", "thickness", "upper", "lower", "front", "rear", "left", "right", "vertical", "horizontal", "top", "bottom", "interior", "exterior" are based on orientation or relation of position accompanying drawings show. They are simply for purpose of description of the present invention and simplifying of description, and do not mean or suggest the devices or components have a specified orientation and constructed and operated in a specified orientation; therefore, it should not be understood as limitation of the present invention. Furthermore, terms "first" and "second" are used simply for purpose of description and cannot be understood to mean or suggest relative importance or implicitly mean amount of the technical features. Therefore, features with terms "first" and "second" can mean or implicitly include one or more of the features. In description of the present invention, "multiple" means two or more unless otherwise clearly and concretely specified.

Contents disclosed below provide many different embodiments or examples to realize different structures according to the present application. For the purpose of simplifying description of the present application, contents below describe parts and configuration of specific examples. Naturally, they are merely for illustration and do not intend to limit the present application. Furthermore, reference numerals and/or letters can be repeated in different examples of the present application, and this repeat is for the purse of simplification and clearness, not indicating relations between various embodiments and/or configurations under discussion. Furthermore, the present application provides examples of various specific processes and materials; however, a person of ordinary skill in the art can think of applications of other processes and/or materials.

FIG. 1 is a structural schematic diagram of a conventional liquid crystal display module. The liquid crystal display module includes a backlight module 10 and a liquid crystal module 20, wherein the backlight module includes a light source 101, a light guide plate substrate 102, a reflecting layer 103, scattering netted dots 104, a diffuser 105, a lower prism 106, and an upper prism 107, and the liquid crystal module 20 includes a lower polarizer 201, a lower glass substrate 202, a thin film transistor (TFT) array 203, a liquid crystal layer 207, a color filter (CF) layer 204, an upper glass substrate 205, and an upper polarizer 206. In a conventional liquid crystal display panel, the backlight module has a complicated structure and assembly process, impeding realization of lightweight and thinness of the liquid crystal display module.

Figure 2:
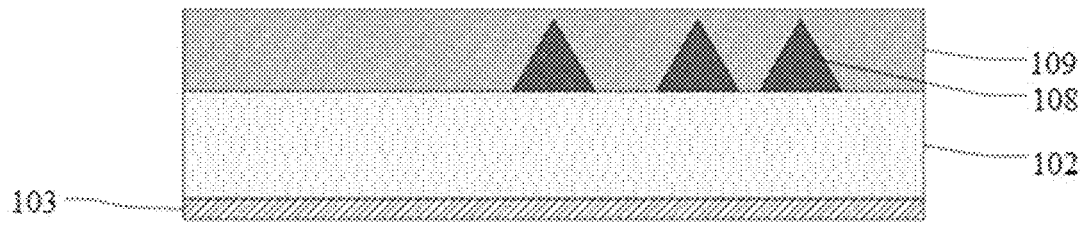
FIG. 2 is a structural schematic diagram of a light guide plate according to an embodiment of the present application.

Embodiments of the present application provide a light guide plate. Specifically, referring to FIG. 2 and FIG. 6, the light guide plate can be applied to a backlight module of a liquid crystal display module, especially to an edge light backlight module. The backlight plate 100 includes a substrate 102, a first refractive index layer 108, a second refractive index layer 109, and a reflective layer 103.

The substrate 102 has a refractive index of no. The substrate 102 can use a light guide plate substrate material known in the art, such as a silicon dioxide glass substrate or an organic glass substrate.

The first refractive index layer 108 is disposed on an upper surface of the substrate 102, the first refractive index layer 108 has a refractive index of $n_1$, and $n_1 > n_0$.

Figure 6:
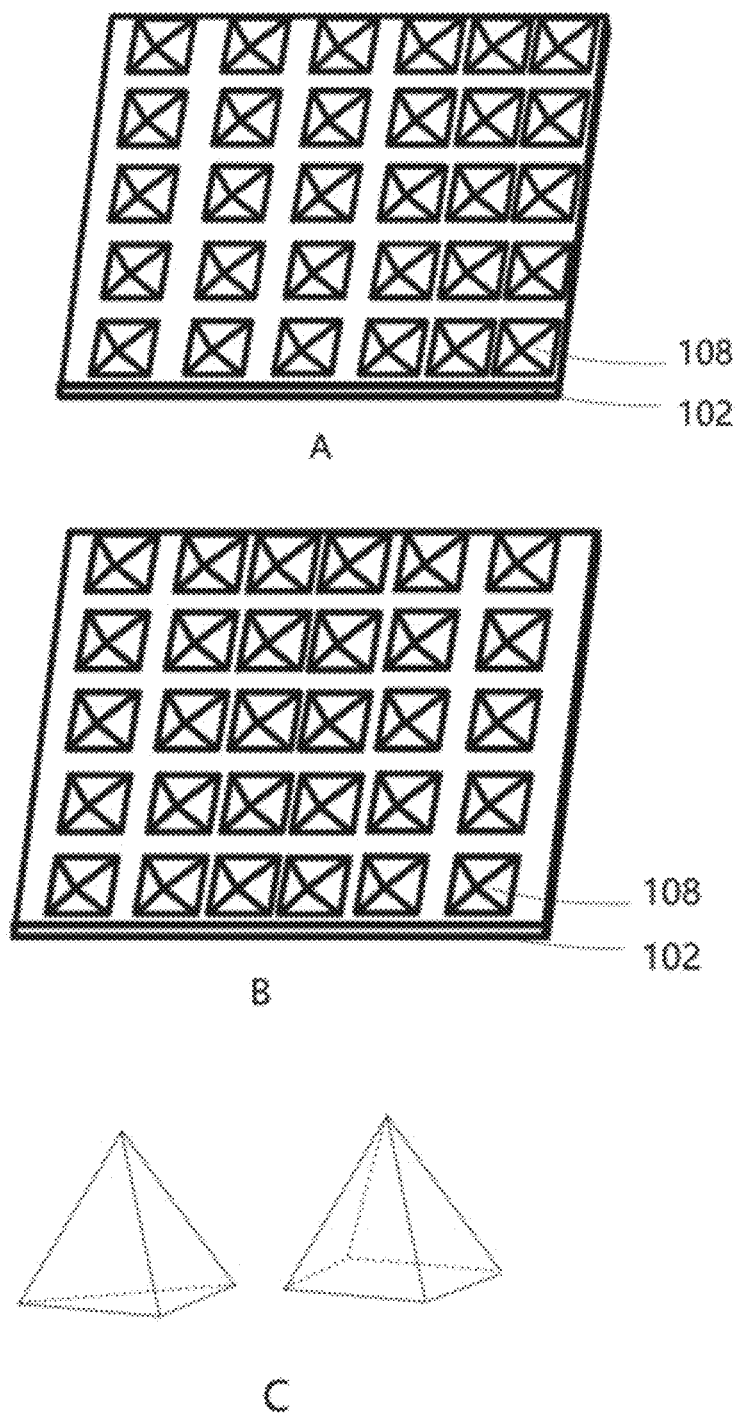
FIG. 6 is a distribution schematic diagram of prism-structured netted dots in the light guide plate according to an embodiment of the present application.

Referring to FIG. 6, the first refractive index layer 108 is a structure of a plurality of prisms distributed on the upper surface of the substrate 102, forming prism-structured netted dots. A shape and a size of the prism structure are not limited, a lower surface of the prism structure is disposed on the upper surface of the substrate 102, and a top end opposite to the lower surface directs to a direction in which light emits out.

In some embodiments, the prism structure of the first refractive index layer 108 is a triangular pyramid or a quadrangular pyramid (as shown in FIG. 6C). For example, the prism structure is a triangular pyramid whose vertical cross section at an apex is an isosceles triangle. A lower surface of the triangular pyramid is disposed on the upper surface of the substrate 102, the lower surface is a triangle with sides of equal length, the apex of the triangular pyramid is located on a vertical line at a center of the lower triangle, and three side faces of the triangular pyramid are equilateral triangles. The triangular pyramid is arranged on the upper surface of the substrate 102. Advantageously, each side of the prism structure has an equal length. The prism structure can also be a quadrangular pyramid whose vertical cross section at an apex is an equilateral triangle. The quadrangular pyramid is a square pyramid, a lower surface is a square, the apex is located on a vertical line at a center of the lower square, and four side faces of the quadrangular pyramid are equilateral triangles.

FIG. 6A illustrates a distribution of prism-structured netted dots. A distribution density of the prism structure gradually increases from where light is incident and along a transmission direction of the light. For example, prisms on a side close to a light source have the lowest density and the greatest distances between adjacent prism-structured netted dots, and the distribution density of the prism structure increases on a side away from the light source, such that light at an emergence surface is uniformly distributed. FIG. 6B illustrates another distribution of prism-structured netted dots. At a position to which a panel display area corresponds, a distribution density of the prism structure is greater than that at a periphery of a substrate, ensuring sufficient brightness at the display area to improve a display effect.

First, a first refractive index layer surface can be formed on the upper surface of the substrate 102 through coating, spray coating, vapor deposition, etc., and then a plurality of prism structures are formed from the surface, such that the prism-structured netted dots are uniformly distributed on the upper surface of the substrate 102. Methods to form the prism-structured netted dots include but are not limited to imprinting, etching, burning, cutting, etc., and any methods capable of making the first refractive index layer present a prism shape can be adopted by the present invention.

The second refractive index layer 109 is disposed on the first refractive index layer 108, the second refractive index layer 109 has a refractive index of $n_2$, and $n_2 < n_0$. The second refractive index layer 109 can be formed on the first refractive index layer 108 through coating, and the second refractive index layer 109 fills gaps of the prism-structured netted dots of the first refractive index layer 108 and covers apexes of the prism structure to form a planar layer.

The reflective layer 103 is further disposed on a lower surface of the substrate 102. The reflective layer 103 and the first refractive index layer 108 are located at two opposite surfaces of the substrate 102, respectively. In some embodiments, the reflective layer 103 is a metal reflective layer, such as an aluminum (Al) reflective layer or a silver (Ag) reflective layer. The metal reflective layer 103 can be formed on the lower surface of the substrate 102 through processes such as spray coating, coating, electroplating, deposition, etc.

Figure 3:
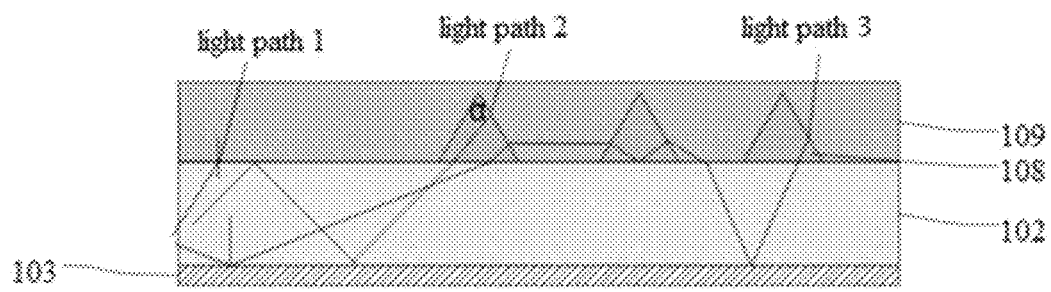
FIG. 3 is a basic light path in the light guide plate according to an embodiment of the present application.

Referring to FIG. 3, each prism structure of the prism-structured netted dots of the first refractive index layer 108 has an apex angle α defined, the apex angle is an apex angle of a sectional triangle at which an incidence point locates when light entering a lower surface of a prism structure, and the sectional triangle is a surface that includes the apex of the prism structure. In one embodiment, when the apex angle of the prism structure is cut in half with respect to a normal of a lower side of the prism, two sub-angles produced are equal, and vertical cross section triangle is an isosceles triangle.

The second refractive index layer 109 has a total internal reflection critical angle δ defined, the total internal reflection critical angle is an incidence angle when an included angle between a refracted light and a normal direction (refracted angle) is ninety degrees, the normal direction is perpendicular to an emergence surface of the substrate 102 (the upper surface of the substrate 102 in FIG. 3), and $\delta = \arcsin(n_2/n_0)$.

When an incident light generated by the backlight module light source 101 enters the substrate 102 and reaches the second refractive index layer 109 with gaps of the prism-structured netted dots, if the incidence angle $\theta_0 < \delta$, then the light enters the second refractive index layer 109 and then emits out to form a first light path, as light path 1 shown in FIG. 3. If the incidence angle $\theta_0 \geq \delta$, because $n_2 < n_0$, a total internal reflection will occur at an interface between the substrate 102 and the second refractive index layer 109. The light goes back into the substrate 102, and, after mirror reflection of the reflective layer 103, reaches the first refractive index layer 108, and because $n_1 > n_0$, a refraction occurs and the light enters the first refractive index layer 108.

When an incident light generated by the light source 101 enters the substrate 102 and reaches the first refractive index layer 108, because $n_1 > n_0$, a refraction occurs and the light enters the first refractive index layer 108.

When the incident light enters the first refractive index layer 108 through the substrate 102, because $n_1 > n_0$, a refraction occurs, and the refraction angle is $\theta_1 = \arcsin((n_0/n_1) \times \sin \theta_0)$. When $\theta_1 \leq (180-\alpha)/2$, an emergent light that passes through a prism structure can enter the second refractive index layer 109 and then emit out to form a second light path, as light path 2 shown in FIG. 3. When $\theta_1 > (180-\alpha)/2$, the emergent light that passes through the prism structure will enter a next prism structure, and, after going through optical effects of the second prism structure and the reflective layer 103, emit again toward the second refractive index layer 109 or the first refractive index layer 108 from the substrate 102, with gradually decreasing incidence angles, until an incidence angle incident at the second refractive index layer 109 is less than $\delta$, or until a refraction angle $\theta_1$ when entering the first refractive index layer 108 is less than or equal to $(180-\alpha)/2$, the emergent light enters the second refractive index layer 109 and then emits out to form a third light path, as light path 3 shown in FIG. 3. On the substrate, through directly disposing the prism structures of the first refractive index layer 108, the metal reflective layer 103, and the second refractive index layer 109, the light guide plate according to the present embodiment realizes adjustment of emergent light angles, and replaces conventional backlight modules with an independent diffuser, reflector, and prism, to realize integrity of a backlight module.

In some embodiment, the light guide plate further includes a third refractive index layer 110, and the third refractive index layer 110 is disposed on an upper surface of the second refractive index layer 109. The third refractive index layer 110 has a refractive index of ns, and $n_3 > n_2$. The refractive index of the third refractive index layer 110 $n_3$ and that of the first refractive index layer $n_1$ can be same or different, and they are both greater than $n_2$. When light emits toward the third refractive index layer 110 through the second refractive index layer 109, a refraction occurs, and the light enters the third refractive index layer 110 and then emits out to enter a liquid crystal layer.

The third refractive index layer 110 is a prism layer, and it can be a prism layer structure known in the art. For example, the prism layer has prisms with a triangle vertical cross section, that are arranged side by side and parallel to a side of the substrate, and a long side of the prisms is parallel to the side of the substrate.

First, a third refractive index layer surface can be formed on the upper surface of the second refractive index layer 109 through coating, spray coating, vapor deposition, etc., and then a prism structure is formed from the surface. Methods to form the prism structure include but are not limited to imprinting, etching, burning, cutting, etc., and any methods capable of making the third refractive index layer present a prism shape can be adopted by the present invention.

In some embodiments, a planarization layer 111 is disposed on the third refractive index layer 110, which can be manufactured through a coating process.

Light guide plate materials known in the art, such as transparent optical resins including polycarbonate, polypropylene, polyethylene terephthalate, poly(methyl methacrylate), acrylic resin, etc., can be adopted for the first refractive index layer 108, the second refractive index layer 109, the third refractive index layer 110, and the planarization layer 111 according to the present invention. As long as refraction indexes satisfy conditions, the effect of adjusting emergent light angles described above can be realized.

Figure 4:
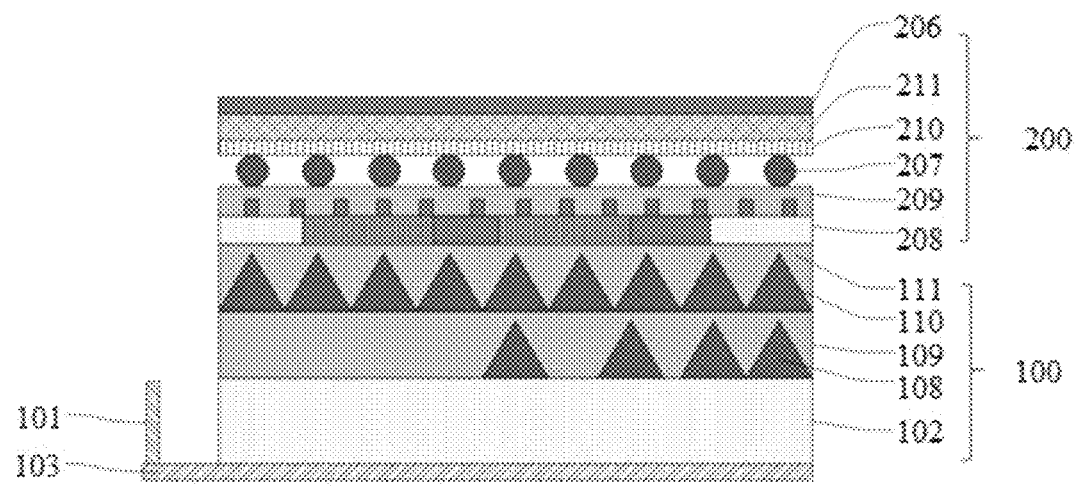
FIG. 4 is a structural schematic diagram of a thin liquid crystal display module using the light guide plate as a color filter (CF) substrate according to an embodiment of the present application.
Figure 5:
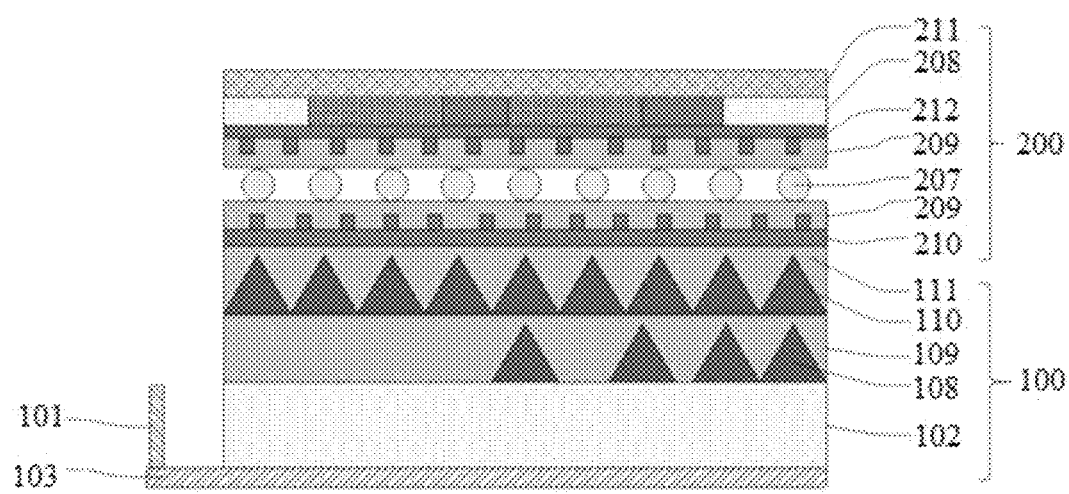
FIG. 5 is a structural schematic diagram of the thin liquid crystal display module using the light guide plate as a thin film transistor (TFT) substrate according to an embodiment of the present application.

Referring to FIG. 4 and FIG. 5, the light guide plate according to embodiments of the present invention, capable of functioning as a color filter (CF) substrate or a thin film transistor (TFT) substrate, can be used to manufacture a liquid crystal display module. Specifically, through a CF process or a TFT process, a CF layer or a TFT array can be manufactured directly on a surface of the light guide plate, such as an upper surface of the planarization layer 111, and then other components of the liquid crystal display module are assembled to present itself. Referring to FIG. 4, in some embodiments, the CF layer 208 is formed on the upper surface of the planarization layer 111 of the light guide plate through the CF process, and then a liquid crystal module 200 is manufactured by sequentially disposing a metal wire grid 209, a liquid crystal layer 207, a TFT layer 210, a glass substrate 211, and an upper polarizer 206 to constitute the liquid crystal display module.

Referring to FIG. 5, in some embodiments, the TFT layer 210 is formed on the upper surface of the planarization layer 111 of the light guide plate through the TFT process, and then the liquid crystal module 200 that sequentially includes a lower metal wire grid 209, a liquid crystal layer 207, an upper metal wire grid 209, an over coat (OC) protection layer 212, and a CF layer 211 is manufactured to constitute the liquid crystal display module.

The liquid crystal display module according to embodiments of the present invention realizes functional integration of a light guide plate, a diffuser, and a reflector within one substrate, decreases a thickness of a backlight, and manufactures a liquid crystal display by using the light guide plate as a substrate to manufacture CF or TFT. Through integrating a backlight module and a liquid crystal panel, a thickness of the liquid crystal display module is decreased to realize thinness and lightweight of a liquid crystal display panel and solve a problem of poor reliability of conventional backlight modules.

A light guide plate, a backlight module, and a liquid crystal display module according to embodiments of the present invention are described in detail above. Specific examples are used to explain principles and embodiments of the present invention, and description of the above embodiments is merely to help understanding of the present invention. Meanwhile, a person of ordinary skill in the art, according to spirit of the present application, would vary in specific embodiments and application ranges. In summary, contents of the specification should not be understood as limitation to the present invention.

What is claimed is:
1. A light guide plate, comprising:
a substrate;
a first refractive index layer comprising a plurality of prism structures, wherein the plurality of prism structures are separated by gaps and are distributed on an emergence surface of the substrate to form prism-structured netted dots, each of the plurality of prism structures has an apex angle $\alpha$;
a second refractive index layer stacked on the first refractive index layer, the second refractive index layer fills the gaps among the prism-structured netted dots, a refractive index of the first refractive index layer $n_1$ is greater than a refractive index of the substrate $n_0$, and a refractive index of the second refractive index layer $n_2$ is less than the refractive index of the substrate $n_0$, the second refractive index layer has a total internal reflection critical angle $\delta$, and $\delta = \arcsin(n_2/n_0)$; and
a reflective layer disposed on a surface of the substrate opposite to the first refractive index layer;

wherein an incident light reaching the second refractive index layer with gaps of the prism-structured netted dots directly through the substrate has an incidence angle $\theta_0$, a first light path is formed when the incidence angle $\theta_0 < \delta$, the incident light enters the second refractive index layer and emits out;

a refraction angle $\theta_1$ is formed when $\theta_0 \geq \delta$, the incident light reaches any prism structure of the first refractive index layer after being totally reflected by the second refractive index layer and reflected by the reflective layer, and the incident light is refracted once by any prism structure, and $\theta_1 = \arcsin((n_0/n_1) \times \sin \theta_0)$;

a second light path is formed when $\theta_1 \leq (180-\alpha)/2$, the incident light refracted once by any prism structure is refracted twice by any prism structure, enters the second refractive index layer and emits out; and a third light path is formed when $\theta_1 > (180-\alpha)/2$, the incident light refracted once by any prism structure is refracted twice by any prism structure, enters another prism structure, then enters the first refractive index layer or exits out from the second refractive index layer after being refracted by another prism structure and reflected by the reflective layer.

2. An edge light backlight module, comprising the light guide plate as claimed in claim 1 and an incident light source, wherein the incident light source is disposed on an incident light side of the light guide plate.

3. The light guide plate as claimed in claim 1, wherein when an apex angle of the prism structures is cut in half with respect to a normal of a lower side of prisms, two sub-angles produced are equal.

4. The light guide plate as claimed in claim 1, wherein the prism structures are distributed on the emergence surface of the substrate as distributed netted dots, such that light emitting out from the emergence surface of the substrate is uniformly directed out through the prism-structured netted dots.

5. The light guide plate as claimed in claim 4, wherein a distribution density of the prism structures gradually increases from where the light is incident and along a transmission direction of the light, on a side close to a light source there are greatest distances between adjacent prism-structured netted dots, and the distribution density of the prism structures increases on a side away from the light source.

6. The light guide plate as claimed in claim 4, wherein a distribution density of the prism structures at a position to which a panel display area corresponds is greater than a distribution density at other areas.

7. The light guide plate as claimed in claim 4, wherein the prism structures are a triangular pyramid or a quadrangular pyramid, and a lower surface of the triangular pyramid or the quadrangular pyramid is disposed on the substrate.

8. The light guide plate as claimed in claim 5, wherein sides of the prism structures have equal length.

9. The light guide plate as claimed in claim 1, wherein the second refractive index layer fills gaps between the prism-structured netted dots of the first refractive index layer and forms a planar upper surface.

10. The light guide plate as claimed in claim 1, further comprising a third refractive index layer and a planarization layer, wherein the third refractive index layer and the planarization layer are sequentially stacked on an upper surface of the second refractive index layer.

11. The light guide plate as claimed in claim 10, wherein the third refractive index layer is a prism layer, and a refractive index of the third refractive index layer $n_3$ is greater than a refractive index of the second refractive index layer $n_2$.

12. The light guide plate as claimed in claim 11, wherein the refractive index of the third refractive index layer n3 is equal to a refractive index of the first refractive index layer n1.

13. A liquid crystal display module, comprising the edge light backlight module as claimed in claim 12.

14. The liquid crystal display module as claimed in claim 13, wherein a color filter layer or a thin film transistor array is disposed on a surface of the light guide plate in the edge light backlight module.

* * * * *